United States Patent [19]

Kainer

[11] 4,415,175
[45] Nov. 15, 1983

[54] COUPLER LATCH MECHANISM WITH A SELF-OPENING FEATURE

[75] Inventor: Carl E. Kainer, Cedar Falls, Iowa
[73] Assignee: Deere & Company, Moline, Ill.
[21] Appl. No.: 391,260
[22] Filed: Jun. 23, 1982
[51] Int. Cl.³ .............................................. B60D 1/04
[52] U.S. Cl. ................................ 280/460 A; 172/272; 280/461 A; 280/510
[58] Field of Search ........... 280/460 R, 460 A, 461 R, 280/461 A, 477, 508, 509, 510; 172/272, 275

[56] References Cited

U.S. PATENT DOCUMENTS

| | | | |
|---|---|---|---|
| 3,172,686 | 3/1965 | Beard | 280/461 A |
| 3,195,651 | 7/1965 | Todd | 280/461 A |
| 3,544,133 | 12/1970 | Lemmon et al. | 280/479 |
| 3,829,128 | 8/1974 | Sutton et al. | 280/461 A |

Primary Examiner—Joseph F. Peters, Jr.
Assistant Examiner—D. Lynn Fugate

[57] ABSTRACT

A coupler latch mechanism is disclosed having a self-opening hook-up feature for facilitating the hook-up of an implement to the hitch on a tractor. The coupler latch mechanism includes a latch bar pivotally connected to a coupler frame immediately above a hook. A trigger member is pivotally connected to a midsection of this latch bar and has a downwardly projecting finger which is located rearward of the lower portion of the latch bar. The forward end of the trigger member is pivotally connected to a link, which is in turn pivotally connected to the frame. The point of attachment of the trigger member to the link is also the point of attachment of the trigger member to a vertical rod, which extends up through the frame. The upper end of the rod is pivotally attached to a lever pivotally connected to the frame. The control latch mechanism is able to open as an implement hitch pin presses against the finger of the trigger member. This action causes the trigger member to pivot on the latch bar forcing the rod up and the lever to open. As the lever opens, the latch bar moves clear of the hook and permits engagement of the implement hitch pin. The lever will then remain open until the operator manually closes it.

14 Claims, 4 Drawing Figures

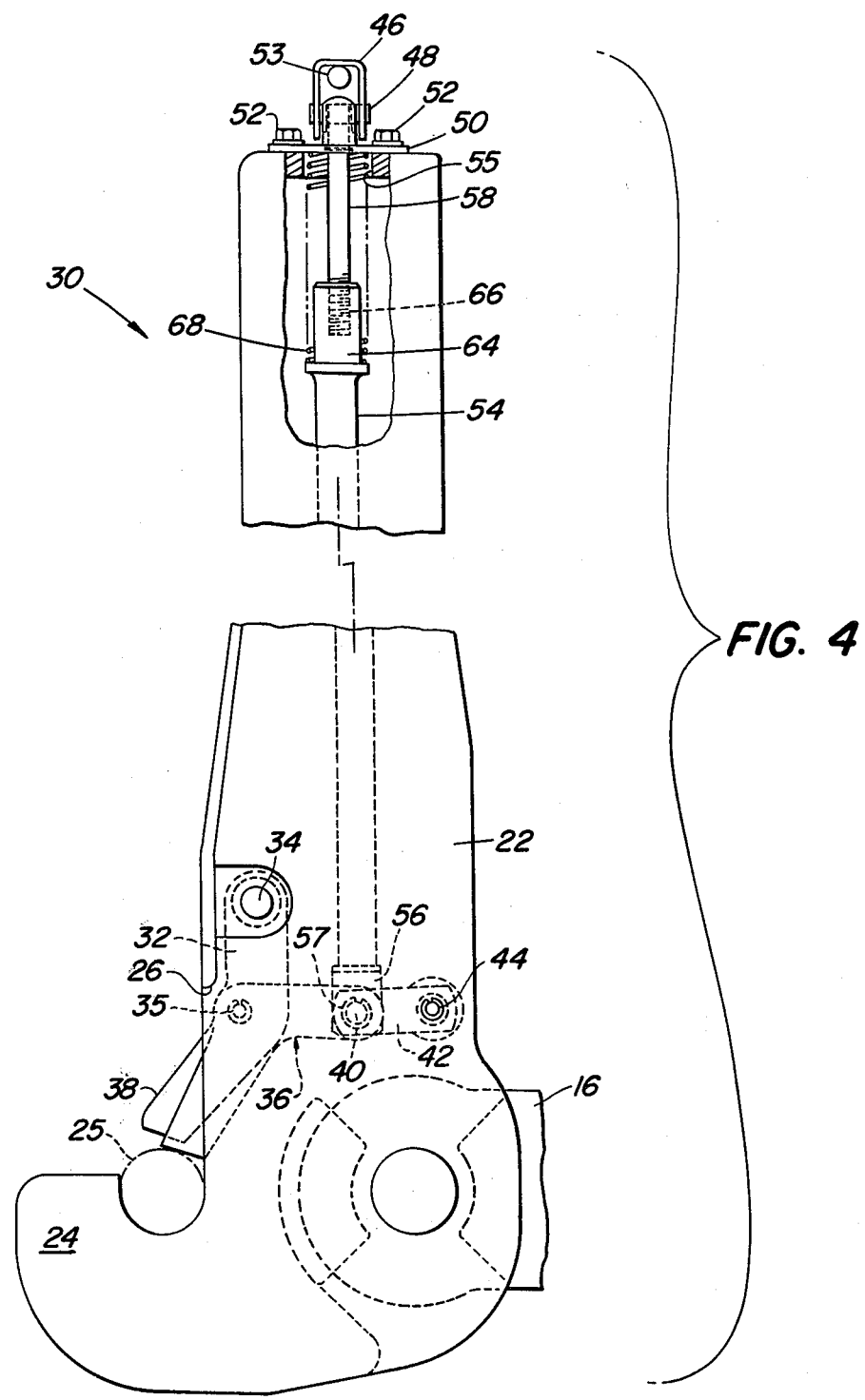

COUPLER LATCH MECHANISM WITH A SELF-OPENING FEATURE

FIELD OF THE INVENTION

This invention relates to a coupler latch mechanism having a self-opening hook-up feature for facilitating the connection of a hitch pin to a hook member.

BACKGROUND OF THE INVENTION

Agricultural and industrial tractors normally have rearmounted three-point hitches which contain at least two coupler latch mechanisms. One example of such a coupler latch mechanism and its method of operation, is disclosed in U.S. Pat. No. 3,544,133, issued to Lemmon et al in 1970. With this type of coupler latch, the operator first dismounts from his tractor and manually opens the bottom two latches on the three-point hitch. He then climbs back into the tractor cab and backs the tractor up to an attachable implement such that the hitch pins on the implement engage in the hooks on the three-point hitch. The operator again dismounts from the tractor and manually closes the latches, making sure the hitch pins are fully inserted into the hooks. After closing the latches, the operator must again climb back into the tractor cab.

It is desirous to provide a coupler latch which would self-open for hook-up with the hitch pins on an implement and remain open after hook-up to force the operator to examine and manually close the latches. For safety purposes, it is not advantageous to provide a self-closing feature. Such a coupler latch would reduce the number of times the operator would have to climb into and out of the tractor cab for each hook-up.

SUMMARY OF THE INVENTION

Briefly, this invention relates to a coupler latch mechanism having a self-opening hook-up feature, which when used as part of a tractor hitch, will facilitate the attachment of an implement. The coupler latch mechanism is mounted on a frame member having a hook positioned on a lower portion thereof. The latch mechanism includes a latch bar which is pivotally connected at one end to the frame and which is movable between an open position permitting engagement of an implement hitch pin into the hook and a closed position preventing disengagement of the hitch pin from the hook. Pivotally connected at approximately its midpoint to the middle section of the latch bar is an angular trigger. The trigger has a downwardly extending finger which projects rearward of the latch bar and extends across a portion of the opening to the hook. The trigger is movable between an open position permitting engagement of the hitch pin into the hook and a closed position preventing release of the hitch pin from the hook. A forward end of the trigger is pivotally connected to a link which is in turn pivotally connected to the frame. The link and trigger are so aligned that the connection therebetween is below the points of connection of the link to the frame and the trigger to the latch bar. The coupler latch also includes a lever pivotally connected to an upper portion of the frame which is movable between an open and a closed position. The lever is joined by a vertically movable rod to the point where the trigger is connected to the link. A spring is also present which is positioned about the rod so as to urge it downward thereby causing the lever, the trigger and the latch bar to favor the closed position.

Upon contact of the implement hitch pin against the finger of the trigger, the trigger will pivot on the latch bar and force the rod upward. This in turn will cause the latch bar to be moved towards the open position along with the lever so that the hitch can enter the hook. Once the lever is completely open, it can only be closed manually, thereby forcing the operator to visually inspect the coupling. With the lever closed, the latch bar will prevent the hitch pin from coming out of the hook.

The general object of this invention is to provide a coupler latch mechanism having a self-opening hook-up feature. A more specific object of this invention is to provide a coupler latch mechanism for the rear mounted hitch on an agricultural or industrial tractor which has a self-opening hook-up feature to facilitate the attachment of an implement.

Another object of this invention is to provide a coupler latch mechanism having a self-opening hook-up feature and an over-center spring mechanism which keeps the handle of the latch open after hook-up to require the operator to examine the hook-up and manually close the latch.

Still another object of this invention is to provide a coupler latch mechanism which is simple and economical to build.

A further object of this invention is to provide a coupler latch mechanism with a self-opening hook-up feature which is useable on current existing hitches.

Still further, an object of this invention is to provide a coupler latch mechanism which permits hookup to an implement even when the latch is left in the closed position.

Other objects and advantages of the present invention will become more apparent when considered in connection with the following description and the drawings.

BRIEF DESCRIPTION OF THE DRAWINGS

FIG. 4 is an end view taken along line 4—4 of FIG. 3 having a portion of the frame broken way to show the internals of the coupler latch mechanism.

DETAILED DESCRIPTION OF THE PREFERRED EMBODIMENT

Figure 1:
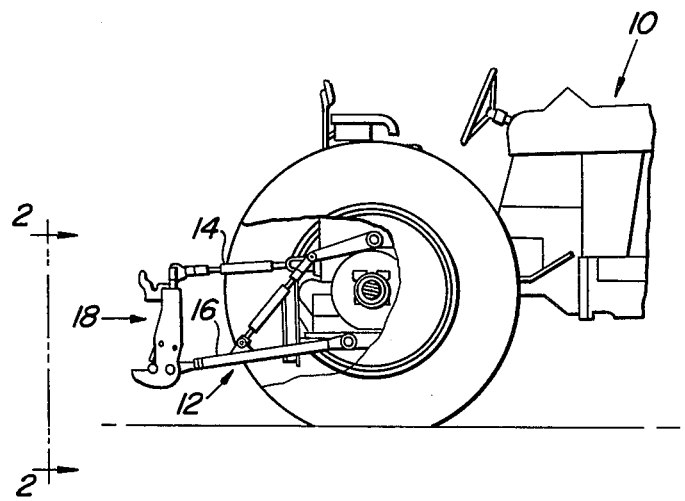
FIG. 1 is a side elevational view of the rear portion of a tractor provided with a coupler latch mechanism according to the present invention, parts of the tractor being broken away to illustrate the three-point hitch.
Figure 2:
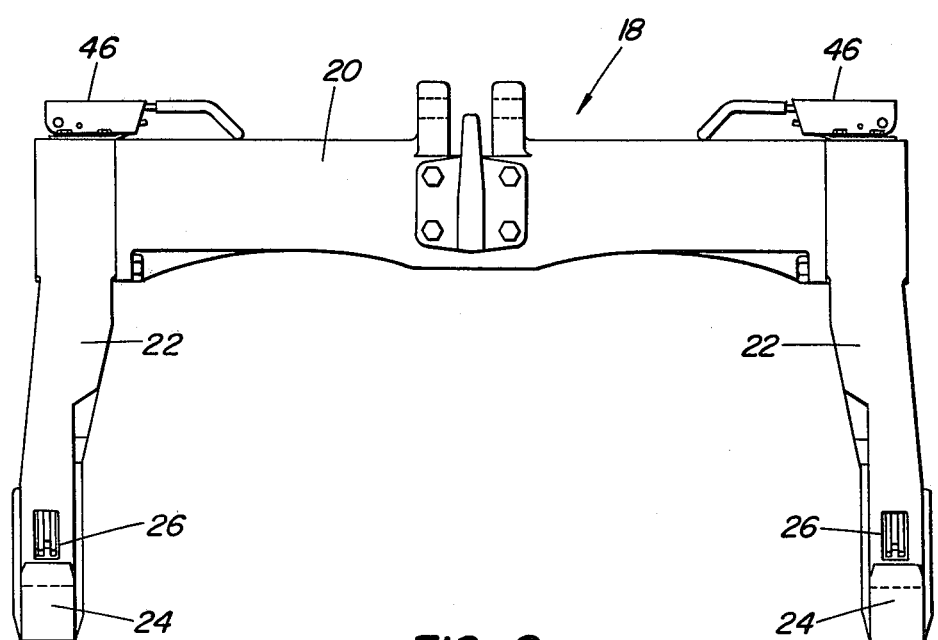
FIG. 2 is a rear elevational view taken along line 2—2 of FIG. 1 showing the coupler latch mechanism attached to a coupler frame.

FIG. 1 shows an agricultural tractor 10 having a rear mounted three-point hitch 12 with upper and lower links 14 and 16, respectively. Attached to the three-point hitch 12 is a coupler frame 18, best seen in FIG. 2, which is configured as an inverted generally U-shaped member. The frame 18 includes a transverse bight portion 20 and a pair of hollow dependent legs 22. The lower end of each leg 22 is provided with an upwardly open and rearwardly extending hook 24, see FIG. 4, which is adapted to receive a hitch pin 25 of an associated implement. Each leg 22 also contains a rearwardly facing aperture 26 formed just above the hook 24.

Figure 3:
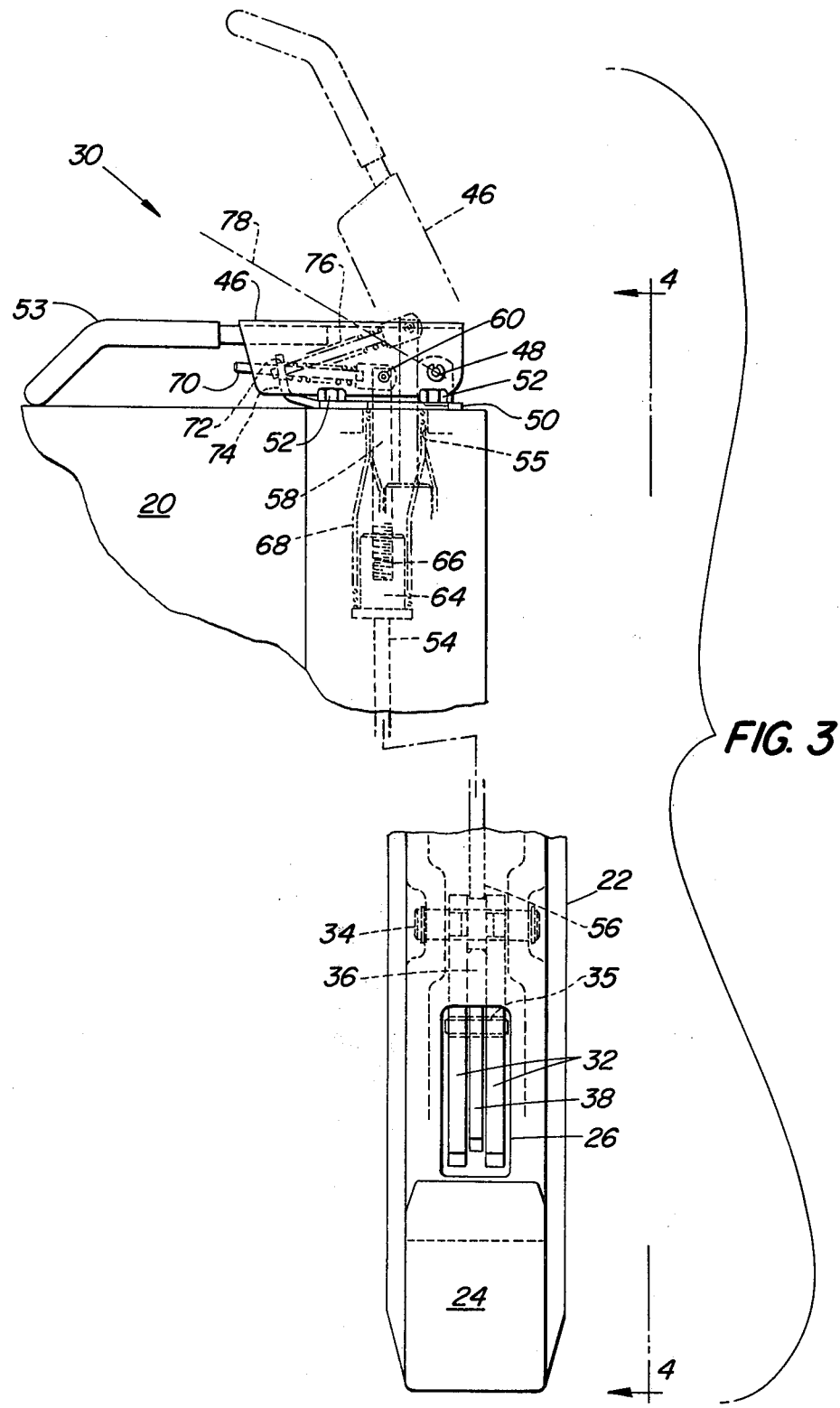
FIG. 3 is an enlarged rear view of the right half of FIG. 2 showing the coupler latch mechanism in detail.

A coupler latch mechanism, indicated generally as 30 in FIGS. 3 and 4, is constructed in each leg 22. For purpose of simplicity, the coupler latch mechanism 30 will be described in conjunction with a single leg. Each coupler latch mechanism 30 includes a latch bar 32 which is pivotally connected at one end by a pin 34 to the leg 22 just above the aperture 26. Preferably, the latch bar 32 is forked shaped, see FIG. 3, and is configured to angle out rearwardly above the hook 24. The latch bar 32 is pivotable on the pin 34 and can move between an open position wherein it is moved forward to permit engagement of an implement hitch pin in the hook 24 and a closed position, see FIG. 4, wherein it is positioned rearward and prevents disengagement of the implement hitch pin from the hook 24.

Pivotally connected by a pin 35, appropriate its midpoint to a middle section of the latch bar 32, is a trigger member 36. The trigger member 36 is angular in shape and has a downwardly extending finger 38 which projects rearward of the latch bar 32 when the trigger member 36 is in a closed position, as shown in FIG. 4. An inner end of the trigger member 36 is pivotally connected by a pin 40 to a link 42 so as to form a toggle linkage. Specifically, the link 42 is pivotally connected by a pin 44 to the hollow frame structure of the leg 22. The point of connection 40 of the trigger member 36 to the link 42 is below a line drawn between the centers of the pivot pins 35 and 44. This means that as the trigger member 36 pivots at pin 35, the pin 40 will move upward above the line drawn between the centers of the pivot pins 35 and 40. Such motion will cause the finger 38 of the trigger member 36 to mve forward to an open position thus causing the latch bar 32 to also pivot forward about its pivot point 34.

The control latch mechanism 30 also includes a lever 46 which is pivotally connected by a pin 48 to a support bracket 50. The support bracket 50 is securely fastened by bolts 52 to the bight portion 20 of the coupler frame 18, immediately above each leg 22. The lever 46 contains a handle 53 which is designed to be grasped by the operator as he moves the lever 46 between open and closed positions. The open position of the lever 46 is shown in phantom in FIG. 3. Connecting the lever 46 to the trigger member 36 is a rod 54 which forms a motion transmitting link and passes through an opening 55 formed in the top surface of the leg 22 and the support bracket 50. A lower end 56 of the rod 54 is forked and contains an aperture 57 through which the pin 40 passes. An upper end 58 of the rod 54 is pivotally connected to the lever 46 by a pin 60 in such a manner that as the lever 46 is pivoted about the pin 48, the rod 54 is moved vertically. In particular, as the lever 46 is moved from its closed to its open position, the rod 54 is moved upward, and as the lever 46 is moved from its open to its closed position, the rod 54 is moved downward. Such movement of the rod 54 will cause the pin 40 to also move in a corresponding fashion and this in turn opens and closes the trigger member 36.

In order to be able to adjust the position of the lever 46 with respect to the position of the trigger member 36, the rod 54 is made length-adjustable. Specifically, the rod 54 is made of upper and lower sections 56 and 58, with the upper section having a threaded lower end received in a threaded bore 66 provided in an enlarged shoulder 64 forming the upper end of the lower section. By adjusting the depth to which the upper section is threaded into the bore 66, the overall length of the rod 54 can be changed to obtain the desired amount of movement of both the lever 46 and the latch bar 32. It should be noted that a spring 68 encircles the upper section of the rod 54 and is sandwiched between the enlarged shoulder 64 and the bottom of the support bracket 50. The spring 68 functions to retain the layer 46 and the latch bar 32 in their closed positions.

The control latch mechanism 30 further includes a guide member 70, see FIG. 3, which is pivotally connected at one end by the pin 60 to both the lever 46 and the rod 54. The opposite end of the guide member 70 projects through an opening 72 formed in an upturned portion 74 of the support bracket 50. Preferably, the guide member 70 is arranged almost perpendicular to the rod 54 when the lever 46 is in its closed position and is capable of sliding axially relative to the opening 72 as the lever 46 is pivoted upward.

Surrounding the guide member 70 is a spring 76 which functions to urge the lever 46 to its open position once the lever 46 is moved past a line (denoted as 78) located midway between the open and closed positions of the lever 46. The spring 76 also ensures that the lever 46 will remain in the open position until the operator manually depresses it to the closed position.

Operation

Starting from a position wherein an implement hitch pin 25 is not in engagement with the hook 24, and with the lever 46, the trigger member 36, and the latch bar 32 all being closed, the coupler latch mechanism 70 operates in the following manner. As the operator backs the tractor 10 against an implement to be attached, the implement hitch pin 25 will abut against the finger 38 and cause it to move forward. Forward movement of the finger 38 causes the trigger member 36 to pivot about pin 35 such that the pin 40 will be urged upward. As the force exerted on the finger 38 becomes greater than the force in the spring 68, the pin 40 and rod 54 will move upward causing the lever 46 to open. This is the self-opening feature of this invention. Once the lever 46 reaches the midline 78, the guide member spring 76 will urge the lever 46 to the fully open position. As this occurs, the rod 54 is moved upward even more causing the trigger member 36 to pull the latch bar 32 forward of the hook 24. The implement hitch pin 25 is then able to engage the hook 24.

With the lever 46 positioned in the open position, the latch bar 32 and the trigger member 36 will also remain open because the force in the spring 68 is insufficient to move the lever 46 back to the closed position. This means that the operator has to manually depress the handle 53 in order to close the lever 46. In do doing, he will be able to visually inspect the connection to make sure that the implement hitch pins 25 are fully inserted into the hooks 24. As the operator depresses each lever 46 to its closed position, the associated guide member 70 slides through the opening 72 and the spring 76 compresses. Once the lever 46 has passed the midpoint line 78 the other spring 68 will force the lever 46 to the closed position. The force of the springs 76 biases the lever 46 upward and the force of the spring 68 biases the lever 46 downward thereby ensuring that the lever 46 is snapped into the open or closed position. This assures the operator that the coupler latch mechanism 30 is either positively open or positively closed.

As the lever 46 closes, it forces the rod 54 downward to its initial position wherein the pivot pin 40 is below the center line of the points 35 and 44. The downward movement of the rod 54 also causes the trigger member 36 and the latch bar 32 to move to their initial positions thereby locking the implement hitch pin 25 in the hook 24. It should be noted that any upward movement of the implement hitch pin 25 will be restrained only by the lower edge of the latch bar 32 and since the latch bar 32 cannot move forward without first applying a force onto the finger 38, the implement hitch pin cannot come out of the hook 24.

Disconnection of the implement hitch pins 25 from the hooks 24 requires that the levers 46 to be opened manually by the operator.

While this invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A coupler latch mechanism having a self-opening hookup feature for facilitating connection of a hitch pin to a hook member, said hook member including a frame with a hook formed on a lower portion thereof, said coupler latch mechanism comprising:
   (a) a latch bar pivotally connected to said frame above said hook and movable between an open position permitting engagement of said hitch pin into said hook and a closed position preventing disengagement of said hitch pin from said hook;
   (b) a trigger pivotally connected to said latch bar and having a finger extending downwardly towards said hook and rearwardly beyond said latch bar, said trigger being movable between an open position permitting engagement of said hitch pin into said hook and a closed position preventing release of said hitch pin from said hook;
   (c) a lever pivotally connected to an upper portion of said frame and movable between an open and a closed position;
   (d) a motion transmitting link extending between and having opposite ends pivotally connected to said lever and to said trigger such that manual movement of said lever from its open to its closed position will effect movement of said trigger and said latch bar from their respective open to their respective closed positions, such that movement of said trigger from its closed to its open position by engagement with said hitch pin will effect movement of said latch bar and said lever to their respective open positions; and
   (e) biasing means urging said rod to a downward position for yieldably resisting movement of said trigger and said latch bar to their respective open positions when said lever is in its closed position whereby contact of said hitch pin against said finger causes said trigger to pivot on said latch bar and force said rod upward thereby opening said lever and effecting self-opening of said latch bar so that said hitch pin can engage said hook.

2. The coupler latch mechanism of claim 1 wherein said motion transmitting link is length adjustable.

3. The coupler latch mechanism of claim 1 wherein said trigger is pivotally connected at a central portion thereof to a central portion of said latch bar.

4. The coupler latch mechanism of claim 1 wherein overcenter means is connected to said trigger for preventing movement of said latch bar towards its open position unless said trigger is being moved towards its open position.

5. A coupler latch mechanism having a self-opening hookup feature for facilitating connection of a hitch pin to a hook member, said hook member including a leg with a hook formed on a lower portion thereof, said coupler latch mechanism comprising:
   (a) a latch bar pivotally connected at one end to said leg and being movable between an open position permitting engagement of said hitch pin into said hook and a closed position preventing disengagement of said hitch pin from said hook;
   (b) a trigger member pivotally connected approximate its midpoint to a middle section of said latch bar and having a downwardly extending finger projecting rearward beyond said latch bar, said trigger member being movable between an open position permitting engagement of said hitch pin into said hook in a closed position preventing release of said hitch pin from said hook;
   (c) a link pivotally connected at a first end to said leg and at a second end to said trigger member, said point of connection of said link to said trigger member being below a line drawn between said point of connection of said link to said leg and said point of connection of said trigger to said latch bar when said trigger member is in its closed position so as to form a toggle linkage;
   (d) a lever pivotally connected to an upper portion of said leg and movable between open and closed positions;
   (e) a rod pivotally connected at an upper end to said lever and at a lower end to said toggle linkage; and
   (f) biasing means urging said lever towards its closed position and yieldably resisting movement of said lever towards its open position whereby said trigger member, latch bar and lever may be moved from their respective closed positions to their respective open positions by contacting said hitch pin against said finger to thereby cause said trigger member to pivot on said latch bar and force said rod upward to open said lever and concurrently pivot said latch bar to its open position so that said hitch pin can engage said hook.

6. The coupler latch mechanism of claim 5 wherein said rod is length adjustable.

7. The coupler latch mechanism of claim 5 wherein said biasing means is a spring positioned about a portion of said rod.

8. The coupler latch mechanism of claim 5 wherein a guide member is pivotally connected at one end to said lever and has a second end which projects through an opening formed in an upper portion of said leg, said guide member being capable of sliding axially with respect to said opening thereby restricting movement of said lever to a single plane.

9. The coupler latch mechanism of claim 8 wherein said guide member supports a spring which urges said lever to said open position once said lever is moved past a midline located between said open and closed positions.

10. A coupler latch mechanism having a self-opening hook-up feature for facilitating connection of an implement to a hitch mounted on a tractor, said hitch including an inverted generally U-shaped frame member with a transverse bight and a pair of dependent legs, a lower portion of each of said legs having an upwardly facing hook for receiving an implement hitch pin, said coupler latch mechanism comprising:
  (a) latch bars pivotally connected at one end to each of said legs and movable between an open position permitting engagement of said implement hitch pins into said respective hooks and a closed position preventing disengagement of said implement hitch pins from said respective hooks;
  (b) angular trigger members pivotally connected approximate their midpoint to a middle section of each of said latch bars and each having a finger which extends downward towards said respective hook and rearward beyond said respective latch bar, said trigger members being movable between an open position permitting engagement of said implement hitch pins into said respective hooks and a closed position preventing release of said implement hitch pins out of said respective hooks;
  (c) links pivotally connected at a first end to each of said legs and at a second end to each of said triger members, said point of connection of each of said links to said respective trigger member below a line drawn between said point of connection of each of said links to said respective leg and said point of connection of each of said trigger members to said respective latch bar when the latter is in its closed position;
  (d) angular brackets secured to the top of each leg and having an opening formed in one end thereof;
  (e) levers pivotally connected to an upper portion of each of said brackets, said levers being movable between open and closed positions;
  (f) guide members pivotally connected at one end to each of said levers and having a second end slidably received in said openings of said brackets thereby restricting movement of said levers to a single plane;
  (g) first biasing means positioned about said guide members for urging said levers toward said open position once said levers are moved past a midline located between said open and closed positions;
  (h) rods pivotally connected at an upper end to each of said levers and at a lower end to said point of connection of each of said trigger members to said respective link; and
  (i) second biasing means positioned about said rods for urging said levers toward said closed position, whereby said latch bars, trigger members and levers can be pivoted from their respective closed positions to their respective open positions by contacting said implement hitch pins against said fingers, thereby causing said trigger members to pivot on said latch bars and force said rods upward compressing said second biasing means and effecting self-opening of said latch bars so that said hitch pins can engage said hooks.

11. The coupler latch mechanism of claim 10 wherein each of said rods is length-adjustable.

12. The coupler latch mechanism of claim 10 wherein said first and second biasing means are first and second pairs of springs.

13. The coupler latch mechanism of claim 12 wherein the resistance of said first pair of springs is selected relative to that of said second pair of springs such that once said levers are moved passed their respective midlines when being opened, said first pair of springs will exert a torque on said respective levers urging said levers towards their respective open positions, which is larger than a torque applied to said levers by said second pair of springs in an opposite direction, whereby a force is required to be applied to said levers to both open and close them.

14. A coupler latch mechanism having a self-opening hook-up feature for facilitating the connection of implement hitch pins to a hitch mounted on a tractor, said hitch including an inverted generally U-shaped frame member with a transverse bight and a pair of dependent legs, a lower portion of each leg having an upwardly facing hook for receiving said implement hitch pins, said coupler latch mechanism comprising:
  (a) latch bars pivotally connected at one end to each of said legs and movable between an open position permitting engagement of said implement hitch pins into said respective hook and a closed position preventing disengagement of said implement hitch pins from said respective hook;
  (b) trigger members pivotally connected approximate their midpoint to a middle section of each of said latch bars and each having a downwardly extending finger projecting rearward beyond said respective latch bar, said trigger members being movable between an open position permitting engagement of said implement hitch pins into said respective hook and a closed position preventing release of said implement hitch pins out of said respective hook;
  (c) links pivotally connected at a first end to each of said legs and at a second end to each of said trigger members, said point of connection of each of said links to said respective trigger member being below a line drawn between said point of connection of said links to said respective leg and said point of connection of said trigger members to said respective latch bar when said trigger members are in their respective closed positions;
  (d) brackets secured to the top of each leg having an opening formed in one end thereof;
  (e) levers pivotally connected to an upper portion of each of said brackets, said levers being movable between an open and a closed position;
  (f) guide members pivotally connected at one end to each of said levers and having a second end slidably received in said openings of said brackets and thereby restricting movement of said levers to a single plane;
  (g) a first spring positioned about each of said guide members urging said levers toward said open position once said levers are moved past a midline located between said open and closed positions;
  (h) a rod associated with each of said levers, said rods having an upper end pivotally connected to each of said levers and a lower end pivotally connected to said point of connection of each of said trigger members to said respective link; and
  (i) a second spring positioned about each of said rods urging said levers toward said closed position, whereby contact of said implement hitch pins against said fingers when said trigger members are in their closed positions will cause said trigger members to pivot on said latch bars and force said rods upward thereby compressing said second springs and opening said levers, thus permitting and concurrently effecting opening of said latch bars so that said pins can engage said hooks.

* * * * *

UNITED STATES PATENT AND TRADEMARK OFFICE
CERTIFICATE OF CORRECTION

PATENT NO. : 4,415,175
DATED : 15 November 1983
INVENTOR(S) : Carl E. Kainer

It is certified that error appears in the above-identified patent and that said Letters Patent is hereby corrected as shown below:

Column 6, line 19, delete "in" and insert -- and --.

Column 7, line 65, delete "passed" and insert -- past --.

Column 7, line 20, delete "triger" and insert -- trigger --;
line 51, delete "againt" and insert -- against --.

Column 8, line 67, after "said", first occurrence, insert
-- hitch --.

Signed and Sealed this

Fourteenth Day of August 1984

[SEAL]

Attest:

GERALD J. MOSSINGHOFF

Attesting Officer

Commissioner of Patents and Trademarks